United States Patent [19]

Buechler et al.

[11] 4,274,992
[45] Jun. 23, 1981

[54] LOW TEMPERATURE CURING POLYESTER RESINS AND COATING COMPOSITIONS

[75] Inventors: Peter R. Buechler, Wyncote; Earl E. Parker, Allison Park; Kenneth L. Mollohan, Freeport, all of Pa.

[73] Assignee: PPG Industries, Inc., Pittsburgh, Pa.

[21] Appl. No.: 102,493

[22] Filed: Dec. 11, 1979

[51] Int. Cl.$^3$ .................... C08K 5/07; C09L 67/00
[52] U.S. Cl. .................... 260/32.8 R; 260/33.2 R; 260/33.4 R; 260/33.6 R; 260/40 R; 525/34; 525/41; 525/42; 525/43; 525/44; 525/48; 525/49
[58] Field of Search .................... 525/10, 34, 36, 39, 525/40, 42, 43, 44, 48, 49; 260/32.8 R, 33.2 R, 33.4 R, 33.6 R

[56] References Cited
U.S. PATENT DOCUMENTS 2,852,487  9/1958  Maker .................................... 525/42

FOREIGN PATENT DOCUMENTS 2601378  7/1977  Fed. Rep. of Germany ............. 525/40
1221889  2/1971  United Kingdom ..................... 525/243

OTHER PUBLICATIONS

Technical Bulletin–Shell Corporation (1965 publication date).

Primary Examiner—J. Ziegler
Attorney, Agent, or Firm—Charles R. Wilson; Thomas M. Breininger

[57] ABSTRACT

Polyester resins are formed by the reaction of alcohols having a hydroxyl functionality of at least one and an allyloxy functionality of at least one, provided the total hydroxyl and allyloxy functionalities are at least three, with saturated dicarboxylic acids or anhydrides. The polyester resins are combined with vinyl monomers to form low temperature cure coating compositions.

14 Claims, No Drawings

LOW TEMPERATURE CURING POLYESTER RESINS AND COATING COMPOSITIONS

BACKGROUND OF THE INVENTION

This invention relates to coating compositions. More particularly, the invention relates to the use of polyester resins in coating compositions, said compositions being capable of conventional application using a low level of organic solvent and capable of curing at a low temperature.

There have been recent concerns as to the polluting effects and health concerns associated with the use of organic solvents. Many coating compositions contain appreciable amounts of organic solvents. Precautions in the use of the coating compositions and the installation of solvent recovery systems have alleviated some of the concerns. However, it would still be desirable to formulate coating compositions containing little or no organic solvent.

Many attempts have been made to lower the organic solvent content of various coating compositions. One line of work has used water as the liquid carrier in place of the organic solvent. However, this has necessitated changes in the resin formulations with a consequent change in performance obtained from the coating compositions. Another line of work has attempted to formulate coating compositions containing a high solids content and thus low organic solvent content. The problem associated with many of the high solids coating compositions has been the fact such compositions normally are highly viscous and are difficult to apply using conventional coating techniques. The formulation of a coating composition having a low organic solvent content which also possesses a viscosity which allows the composition to be applied by conventional coating techniques would be most desirable.

Still another concern with prior used organic solvent containing coating compositions has been the energy demands needed to drive off the solvent and cure the resultant film. Besides the aforediscussed possible pollution concerns with organic solvents there is also the desire to use less energy in order to remove the solvent and form a durable film from coated substrates. Thus, a coating composition which can be applied by conventional means to a substrate and use a small amount of energy to remove solvent and cure the coating would be most desirable.

There have now been found polyester resins which when properly formulated into coating compositions provide compositions which can be readily applied and cured with a low energy demand to give coatings having a desired set of properties.

As used herein all percents and ratios are by weight unless otherwise indicated.

SUMMARY OF THE INVENTION

The polyester resins used in this invention have an allyloxy content of at least about 5 percent and are obtained by the reaction of (i) an alcohol having a hydroxyl functionality of at least one and an allyloxy functionality of at least one, provided the total hydroxyl and allyloxy functionalities are at least three, with (ii) a saturated dicarboxylic acid or anhydride. The polyester resins are used in coating compositions consisting essentially of from about 10 percent to about 75 percent of the polyester resin and about 25 percent to about 90 percent of a vinyl monomer.

DETAILED DESCRIPTION OF THE INVENTION

The following paragraphs describe the polyester resins of this invention, their process of making and their use in coating compositions.

Polyester resins of this invention having an allyloxy content of at least about 5 percent can be made by the reaction of (i) an alcohol having a hydroxyl functionality of at least one and an allyl functionality of at least one, provided the total hydroxyl and allyloxy functionalities are at least three, with (ii) a saturated dicarboxylic acid or anhydride. Specific examples of suitable alcohols include trimethylolpropane monoallyl ether; trimethylolpropane diallyl ether; glycerol allyl ether; pentaerythritol diallyl ether; pentaerythritol triallyl ether; and glycerol diallyl ether. It should be understood oxirane precursors of the alcohols, e.g. allyl glycidyl ether, can be used also with equivalent results. Mixtures of the alcohols can also be used. Preferred alcohols have a hydroxyl functionality of two and an allyl functionality of one.

Many different saturated dicarboxylic acids or anhydrides are reacted with the aforementioned alcohol to produce the polyester resin of this invention. Preferred saturated dicarboxylic acids and anhydrides contain from 4 to 10 carbon atoms. As used herein, dicarboxylic acids or anhydrides which contain only aromatic unsaturation are considered to be saturated since the aromatic double bonds do not react by addition. Examples of suitable acids and anhydrides include succinic acid, glutaric acid, adipic acid, suberic acid, azelaic acid, sebacic acid, phthalic acid, isophthalic acid, terephthalic acid, cyclohexane dicarboxylic acid and their anhydrides where they exist. While small amounts of unsaturated dicarboxylic acids can be mixed with the saturated dicarboxylic acids to provide desired film characteristics, it should be understood such acids slow the cure rate of the films. Generally the unsaturated dicarboxylic acids are avoided in making the polyesters of this invention.

The alcohols and saturated dicarboxylic acid or anhydrides are reacted together at a temperature of from about 160° C. to 210° C. until an acid number of below about 50 is obtained. The equivalent ratio of the alcohol to the saturated dicarboxylic acid or anhydride ranges from about 0.9:1 to about 1.4:1, preferably from about 1:1 to about 1.1:1. Esterification catalysts can be used, if desired, to speed-up the reaction.

The above described polyester resins are combined with vinyl monomers to form coating compositions having especially useful characteristics. The coating compositions consist essentially of from about 10 percent to about 75 percent, preferably from about 30 percent to about 50 percent of the polyester resin and from about 25 percent to about 90 percent, preferably from about 50 percent to about 70 percent of the vinyl monomer.

Several different vinyl monomers are useful. Examples include the carboxylic acids containing from 3 to 8 carbon atoms, e.g., acrylic acid and methacrylic acid; aromatic monomers, e.g., styrene, alpha, methylstyrene, tertiary butyl styrene, vinyl toluene, vinyl xylene; alkyl esters of methacrylic acid which contain from 1 to 12 carbon atoms in the alkyl group, e.g., methyl methacrylate, ethyl methacrylate, butyl methacrylate, and isobutyl methacrylate; alkyl esters of acrylic acid having from 2 to 12 carbon atoms in the alkyl group, e.g., ethyl acrylate, butyl acrylate, 2-ethylhexyl acrylate and hydroxyethyl acrylate; glycol polyacrylates and polymethacrylates, e.g., propylene glycol diacrylate, butylene glycol diacrylate, butanediol diacrylate, hexanediol diacrylate, triethylene glycol diacrylate, polypropylene glycol tetracrylate, ethylene glycol dimethacrylate, butylene glycol dimethacrylate, triethylene glycol dimethacrylate, and 3-acryloxy-2, 2-dimethylpropyl, 3'-acryloxy, 2'2'-dimethylpropionate, and trimethylolpropane triacrylate; and the diacrylate of diglycidyl ether of bisphenol A. Preferred monomers are styrene and methyl methacrylate. Minor levels of monomers which are not vinyl monomers can also be included in the monomer portion of the coating compositions, provided they do not adversely affect the cure of the compositions.

It has been found durable coatings are formed by the reaction of the polyester resins with the vinyl monomers when the film is cured. Particularly noteworthy is the fact a low level of energy is needed to affect a cure, with a consequent small loss of monomer. That is, a temperature as low as 10° C. is sufficient for curing a coating. Preferably a range of temperature of from about 10° C. to about 120° C. is used. Additionally noteworthy is the fact the coating compositions are capable of polymerizing in the form of a thin film on a substrate in the presence of oxygen. Many coating compositions are not capable of forming a durable film under such conditions due to the fact oxygen often inhibits the curing of a film. It is theorized a durable film is formed under the low temperature cure conditions of the present invention as a result of the vinyl monomers copolymerizing with the allyloxy functional groups of the polyester resin to form polymers.

Coating composition additives are generally included in the compositions. For example, pigments, fillers, antioxidants, flow control agents, surfactants, catalysts, accelerators and reactive diluents are often included. Catalysts with or without accelerators are included in the compositions at levels up to about 10 percent of the composition. The compositions generally are organic solvent free, but can contain up to about 35 percent of an organic solvent for ease of application. Suitable solvents include the conventionally used solvents, e.g., the ketones, ethylene glycol mono- and dialkyl ethers, diethylene glycol mono- and dialkyl ethers, toluene and lower alcohols.

The coating compositions are applied by any convenient method including spraying, dipping, rolling, brushing, and flow coating. The compositions have been found especially useful for the coating of metal substrates. Additionally the compositions are useful for coating wood, plastics, walls, cementitious surfaces, etc.

The following examples are illustrative of the described invention.

EXAMPLE I

A 5 liter, 3 necked flask is equipped with thermometer, mechanical stirrer, inlet for dry nitrogen and a fractionating column. The reaction vessel is charged 10.0 moles of adipic acid, 6.7 moles of diethylene glycol and 5.7 moles of triethylolpropane diallyl ether. To this mixture is added 0.005 percent of methyl hydroquinone and 0.005 percent of methyl quinone. The mixture is next heated to 180° C. to make an esterified product of this invention having an acid number of 32.

EXAMPLE II

The reactivity of three similar type polyesters are compared in this example.

A polyester resin (1) of this invention is made by charging to a vessel equipped as in Example I 10 moles of adipic acid, 10.2 moles of trimethylolpropane monallyl ether and 0.01 percent by weight of methyl hydroquinone. The mixture is esterified at 195° C. until an acid number of 15 is obtained.

A polyester resin (2) having no allyloxy functionality is made by reacting ten moles of adipic acid with 10.5 moles of propylene glycol. The components are esterified at 210° C. until an acid number of 4.7 is obtained.

A second comparative polyester resin (3) containing unsaturation but having no allyloxy functionality is made by reacting 6 moles of maleic anhydride, 4 moles of adipic acid and 10.8 moles of propylene glycol. The final reaction mixture has an acid number of 12.7.

The afore-described polyester resins are compared for their reactivity by making a series of formulations, spraying the formulations into films and then running extracts on the films. The formulations are as follows:

| Formulation (%) | A | B | C |
|---|---|---|---|
| Polyester Resin (1) | 23.2 | — | — |
| Polyester Resin (2) | — | 23.2 | — |
| Polyester Resin (3) | — | — | 23.2 |
| Acrylic acid diadduct with the diglycidyl ether of bisphenol A | 23.2 | 23.2 | 23.2 |
| Methyl methacrylate | 46.2 | 46.2 | 46.2 |
| Benzoyl peroxide | 7.4 | 7.4 | 7.4 |
| | 100.0 | 100.0 | 100.0 |

The individual formulations are sprayed onto a Teflon sheet using a catalyst gun to form films varying from 1 to 1.5 mils in thickness. The catalyst gun contains an orifice for delivering the formulation and an orifice for delivering dimethyl-p-toluidine at a rate to provide 7.4 percent of the catalyst, based on the total sprayed amount. The films are stripped immediately, stored in sealed containers and then subjected to Soxhlet extraction in tetrahydrofuran. The percentages of extracts are as follows:

| | Extract |
|---|---|
| Formulation A | 20.1 |
| Formulation B | 39.6 |
| Formulation C | 29.6 |

The more reactive the polymer, the more highly cross-linked it is and thus the less extractable. As can be seen above, the polyester resin (1) has the least amount of extractables thereby indicating its higher reactivity.

EXAMPLE III

This example illustrates the differences obtained when a saturated dicarboxylic acid is reacted with an alcohol having hydroxyl and allyloxy functionalities versus an unsaturated dicarboxylic acid reacted with the same alcohol.

The polyester resin of this invention, polyester resin (1), is made in the manner of Example I by reacting 10 moles of adipic acid with 11 moles of trimethylolpropane monallyl ether in the presence of 0.01 percent hydroquinone. The reactants are reacted until the product has an acid number of 13.7.

Polyester resin (2) is made by reacting 10 moles of fumaric acid (an unsaturated dicarboxylic acid) with 11 moles of trimethylolpropane monallyl ether in the presence of 0.02 percent hydroquinone. The reactants are reacted until the product has an acid number of 47.5.

The above polyester resins are made into coating compositions having the following formulation:

|  | A | B |
| --- | --- | --- |
| Polyester resin (1) | 41.70 | — |
| Polyester resin (2) | — | 41.70 |
| 1,4-Butylene glycol diacrylate | 13.88 | 13.88 |
| 2-Ethyl hexyl acrylate | 4.62 | 4.62 |
| Methyl methacrylate | 32.40 | 32.40 |
| Benzoyl peroxide | 7.40 | 7.40 |
|  | 100.00 | 100.00 |

A catalyst gun is used to spray the individual compositions onto Bonderite-1000 treated steel panels. The catalyst dimethyl-p-toluidine is introduced through a separate orifice into the above formulations as they are being sprayed. The catalyst level is kept equal for both formulations. A coating formed from composition A cures very fast and has a tackless surface. A coating formed from composition B does not cure as fast (though at high levels of catalyst, the differences in the cures become smaller) and has a tacky surface. This illustrates that a saturated backbone polymer with allyl side-chains cures faster than a similar unsaturated type backbone polymer with allyl side-chains.

EXAMPLE IV

This example illustrates a pigmented coated composition using the polyester resin of this invention.

A pigment paste is made on a Cowles dissolver using the following components:

|  | % |
| --- | --- |
| Acrylic acid diadduct of the diglycidyl ether of bisphenol A | 53.0 |
| Hexanediol diacrylate | 10.6 |
| Methyl methacrylate | 1.1 |
| Titanium dioxide 35.3 |  |
|  | 100.0 |

The above mixture is ground to a 6½ Hegman Gauge reading.

The above pigment base is used in making the following coating composition:

|  | % |
| --- | --- |
| Polyester resin of Example II | 9.4 |
| Methyl methacrylate | 37.1 |
| 1,6-Hexanediol diacrylate | 1.9 |
| Benzoyl peroxide | 7.6 |
| Pigment paste | 44.0 |
|  | 100.0 |

The coating composition is sprayed onto primed but unfinished toilet seats and onto Bonderite-1000 pretreated steel panels. The spraying is done with a catalyst gun wherein dimethyl-p-toluidine is introduced into the spray through an orifice in the gun. A very acceptable filled appearance is obtained on both substrates. Each time the coating composition can be handled within 10-12 seconds without finger marking. The non-tackiness of the films is demonstrated by placing freshly coated metal panels together and subjecting them to pressure. The two panels do not stick together and come apart easily. The coatings on each substrate is hard, tough, and extremely abrasion-resistant.

EXAMPLE V

The following pigmented coating composition is formulated:

|  | % |
| --- | --- |
| Polyester resin (1) of Example II | 14.9 |
| Diglycidyl ether of bisphenol A | 1.7 |
| Acrylic acid diadduct of diglycidyl ether of bisphenol A | 1.7 |
| 3-Acryloxy-2,2-dimethylpropyl-3'-acryloxy-2',2'-dimethylpropionate | 14.1 |
| Dicyclopentyldiene methacrylate | 12.3 |
| Bis-(4-t-butylcyclohexyl) peroxydicarbonate | 3.8 |
| Methyl ethyl ketone | 19.2 |
| Titanium dioxide | 32.3 |
|  | 100.0 |

The above composition is mixed with 0.53 percent of a 12 percent solution of cobalt naphthenate. The mixed composition has a pot life in excess of eight hours. A film averaging about 1.15 mils in thickness is cured within ten minutes at 95° C. The film has the following properties: 2H pencil hardness; greater than 40 double rubs with xylene solvent; 55 gloss on 60° meter; good conical mandrel flexibility; greater than 60 foot-pounds direct impact resistance; and excellent recoatability.

EXAMPLE VI

The use of the polyester resin of Example I (derived from trimethylolpropane diallyl ether and adipic acid) in a coating composition is illustrated in this example.

A coating composition is formulated as follows:

|  | % |
| --- | --- |
| Polyester resin of Example I | 23.2 |
| Acrylic acid diadduct with the diglycidyl ether of bisphenol A | 23.2 |
| Methyl methacrylate | 46.4 |
| Benzoyl peroxide | 7.2 |
|  | 100.0 |

The above composition is sprayed using the catalyst gun of Example II onto a Bonderite 1000 substrate. Dimethyl-p-toluidine is used as the catalyst. The resultant coating gels within 18 seconds to a nontacky, tough, and solvent-resistant film.

What is claimed is:

1. A coating composition capable of forming a film when cured at low temperatures, consisting essentially of:
   (a) from about 10 percent to about 75 percent of a polyester resin having an allyloxy content of at least about 5 percent obtained by the reaction of (i) an alcohol having a hydroxyl functionality of at least one and an allyloxy functionality of at least one, provided the total hydroxyl and allyloxy functionalities are at least three, with (ii) a saturated dicarboxylic acid or anhydride; and
   (b) from about 25 percent to about 90 percent of a vinyl monomer.

2. The composition of claim 1 wherein the polyester resin is derived from an alcohol having a hydroxyl functionality of 2.

3. The composition of claim 2 wherein the alcohol has an allyloxy functionality of 1.

4. The composition of claim 1 wherein the alcohol is selected from the group consisting of trimethylolpropane monoallyl ether, trimethylolpropane diallyl ether, glycerol allyl ether, pentaerythritol diallyl ether, pentaerythritol triallyl ether, glycerol diallyl ether and mixtures thereof.

5. The composition of claims 3 or 4 wherein the alcohol is trimethylolpropane monoallyl ether.

6. The composition of claim 1 wherein the polyester resin is derived from a saturated dicarboxylic acid or anhydride having 4 to 10 carbon atoms.

7. The composition of claim 6 wherein the saturated dicarboxylic acid or anhydride is selected from the group consisting of succinic acid, succinic acid anhydride, glutaric acid, adipic acid, suberic acid, azelaic acid, sebacic acid, phthalic acid, phthalic acid anhydride, isophthalic acid, terephthalic acid, cyclohexane dicarboxylic acid, cyclohexane dicarboxylic acid anhydride, and mixtures thereof.

8. The composition of claim 1 wherein the equivalent ratio of the alcohol to the saturated dicarboxylic acid or anhydride ranges from about 0.9:1 to about 1.4:1.

9. The composition of claims 1 or 8 wherein the equivalent ratio of the alcohol to the saturated dicarboxylic acid ranges from about 1:1 to about 1.1:1.

10. The composition of claim 9 wherein the vinyl monomer is selected from the group consisting of carboxylic acids containing from 3 to 8 carbon atoms, aromatic monomers, alkyl esters of methacrylic acid, alkyl esters of acrylic acid, glycol polyacrylates, glycol polymethacrylates, diacrylates of diglycidyl ethers of bisphenol A, and mixtures thereof.

11. The coating composition of claim 9 additionally consisting essentially of up to about 35 percent organic solvent.

12. The coating composition of claim 9, consisting essentially of:
(a) from about 30 percent to about 50 percent of the polyester resin; and
(b) from about 50 percent to about 70 percent of the vinyl monomer.

13. The coating compositions of claim 12 wherein the composition is capable of curing to a durable film at a temperature of about 10° C.

14. The coating composition of claim 1 wherein the composition is capable of curing to a durable film at a temperature of about 10° C.

* * * * *